UNITED STATES PATENT OFFICE 3,325,443
HYDROXYALKYL-SUBSTITUTED ALKYLENIMINE
MODIFIED ALKYL METHACRYLATE RESINS
Roger M. Christenson, Gibsonia, Samuel Porter, Jr., Tarentum, and Andrew Halcoussis, Plum Borough, Pa., assignors to Pittsburgh Plate Glass Company, Pittsburgh, Pa., a corporation of Pennsylvania
No Drawing. Filed Jan. 7, 1966, Ser. No. 519,290
10 Claims. (Cl. 260—41)

This application is a continuation-in-part of copending application Ser. No. 377,119, filed June 22, 1964, now Patent No. 3,290,416.

This invention relates to coating compositions based on polymerized alkyl methacrylates and containing imine-reacted acidic groups, and more particularly to such compositions in which the acidic groups are reacted with a hydroxyalkyl-substituted alkylenimine.

Compositions in which the vehicle comprises a polymer of an alkyl methacrylate, and particularly those containing homopolymers and copolymers of methyl methacrylate, are widely used in coatings for various articles. One especially extensive use of such methacrylate lacquers is in finishes for automobiles and other vehicles.

Coatings based on methcrylate polymers have many outstanding properties, including excellent gloss retention, durability and the like, particularly on outdoor exposure. However, these materials have a serious deficiency in that they have relatively poor adhesion to many substrates, including glass, metals and thermosetting primers. For this reason, it has been necessary, and this is especially true with automotive coatings, to employ a coating procedure in which a primer is first applied and sanded, and then coated with a sealer prior to the application of the finish coat.

More recently, it has been discovered that the adhesion of coatings based on alkyl methacrylate polymers can be greatly improved by the inclusion in the polymeric vehicle of a small proportion of acidic units which are reacted with an imine. Coatings in which a polymer containing such imine-modified acidic units are included in the film-forming component have exceptional adhesion to most surfaces, including metals, glass and conventional primer coatings, including thermosetting primers, and do not require a sealer, sanding, or any of the other expedients normally employed and which are necessary to obtain adequate adhesion of conventional methyl methacrylate lacquers and similar finishes. However, these imine-modified compositions, while greatly superior to ordinary methacrylate finishes in many respects, are also subject to certain disadvantages. For instance, the time required to adequately disperse pigments in these materials is still excessively long, and their reflow and certain other characteristics are often somewhat less than optimum.

The present invention is predicated upon the unexpected discovery that the use of certain N-substituted imines in the aforesaid methacrylate polymers provides coatings which have a number of highly desirable properties not attained by the use of other imines in the same manner. The N-substituted imines employed herein are N-hydroxyalkyl alkylenimines having 2 to 6 carbon atoms in the alkyl group and 2 to 4 carbon atoms in the alkylenimine group.

The advantages attained by the use of these N-hydroxyalkyl imines include:

(1) Better dispersibility, making it possible to obtain satisfactory pigment dispersions in reasonable times. In many applications, such as in the production of compositions for automobile finishes, it is necessary for satisfactory appearance that the coating composition contain very finely and uniformly dispersed pigments, free from agglomerates. Long grinding times are usually necessary to obtain such dispersions, even with the imine-modified polymers mentioned above. The use of N-hydroxyalkyl alkylenimines as in the present invention, however, makes it possible to obtain satisfactory dispersions in about one-third the grinding time required with other imine-modified polymers.

(2) Better reflow characteristics, which mean that on baking of the applied coating minor imperfections and flaws are eliminated, leaving a smooth, glossy surface.

(3) Better resolubility, thus permitting repair of damaged spots without leaving visual traces and without crazing of the surface.

(4) Less yellowing and discoloration on over baking, i.e., baking at higher temperatures or longer times than normal.

(5) Excellent adhesion, comparable to the adhesion of other imine-modified methacrylate polymers. This is surprising since one would expect that the obtention of the foregoing advantages would require coatings with less adhesion and which would make the coatings unsatisfactory in this respect. Surprisingly, this has not been found to be the case.

The coating compositions of this invention contain as the chief film-forming component of the vehicle thereof a polymeric component containing at least about 50 percent by weight of a lower alkyl methacrylate and between 0.1 percent and 3 percent by weight of N-hydroxyalkyl alkylenimine-modified carboxylic acid units, based upon the total amount of methacrylate polymer. In many cases preferred polymers have about 1.0 percent or less of acid groups that are reacted with imine. Methyl methacrylate is greatly preferred as the methacrylate, but other lower alkyl methacrylates containing 1 to 5 carbon atoms in the alkyl group, such as ethyl methacrylate, propyl methacrylate and butyl methacrylate, can also be used in whole or in part.

The acidic units are provided by a vinylpolymerized ethylenic carboxylic acid monomer which is interpolymerized in the polymeric composition, and comprise at least about 0.1 percent, and preferably about 0.25 percent to about 5 percent, of the total weight of the methacrylate polymer. More than about 10 percent is not generally desirable, but can be used in certain instances. All or part of the carboxylic acid groups are reacted with an N-hydroxyalkyl alkylenimine, the proportion depending upon the desired level of imine modification and the total amount of acidic groups, which can be in excess. The reaction with imine is carried out with the acid-containing polymer or with the acidic groups prior to or during the polymerization.

The acid employed to provide the acidic units can be any polymerizable monocarboxylic or polycarboxylic acid, preferably having from 3 to 6 carbon atoms. An acrylic acid is preferred, this term being employed to mean acrylic acid, methacrylic acid, and similar alpha-substituted acrylic acids. Also quite useful are maleic acid and fumaric acid, as well as the half-esters of such dicarboxylic acids, for example, monobutyl maleate. Other acids such as crotonic acid, 3-butenoic acid, tiglic acid, and itaconic acid and its half-esters can also be used, as can various longer chain carboxylic acids containing polymerizable groups. Certain copolymerizable fatty acids such as dehydrated castor oil acids and the like may also be employed.

The preferred N-hydroxyalkyl alkylenimine is N-(2-hydroxyethyl)ethylenimine, which has the formula:

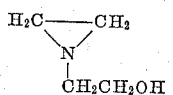

Other N-hydroxyalkyl alkylenimines of the class mentioned can also be used to provide the aforesaid advantages, although generally not to the same extent. Representative compounds include N-(2-hydroxypropyl)propylenimine, N-(3-hydroxypropyl)ethylenimine, N-(4-hydroxybutyl)ethylenimine, and the like.

The reaction with the imine takes place upon admixing the imine and the carboxyl-containing material and heating to moderate temperatures, say 50° C. to 150° C., although higher or lower temperatures can be used, depending upon the desired reaction time. The imine reacts with the carboxylic acid groups, but the exact nature of the reaction which takes place under these circumstances and the structure of the product obtained are not known with certainty. Improved properties are achieved when at least about 0.1 percent of acidic units, based upon the total weight of monomers in the interpolymer, are reacted with the imine, the extent of reaction being based upon the equivalent amount of imine employed.

The reaction with the imine is preferably carried out during or after the polymerization of the alkyl methacrylate. While often the imine reaction is carried out after the acid-containing polymer has been produced, it has been found that some saving of time without any sacrifice in properties is achieved by carrying out the reaction with imine concurrently with the polymerization reaction. In this embodiment, the imine is added to the polymerization mixture at any point prior to the completion of the polymerization reaction. Preferably, the imine is added after the monomers, but before the polymerization is substantially advanced.

The polymerization reaction itself is otherwise carried out in conventional manner, utilizing heat and/or catalysts and varying solvents and techniques. Generally, a free-radical catalyst, such as cumene hydroperoxide, benzoyl peroxide or similar peroxygen compound, or an azo compound is employed. When the polymerization reaction and the reaction with imine are conducted concurrently as described above, azo compounds, and especially alpha, alpha'-azobis(isobutyronitrile), are preferred catalysts.

The interpolymers herein are made from a mixture of monomers containing from about 50 percent to about 99.9 percent by weight of a lower alkyl methacrylate, preferably methyl methacrylate, which is interpolymerized with at least about 0.1 percent by weight of ethylenically unsaturated carboxylic acid and, optionally, about 0 percent to about 49.9 percent by weight of one or more other ethylenically unsaturated monomers copolymerizable with the methacrylate and acid. Among the comonomers which can be employed are ethylenically unsaturated nitriles, for example, acrylonitrile and methacrylonitrile; vinyl aromatic hydrocarbons, such as styrene and vinyl toluene; and other similar monomers. More often employed as comonomers are ethyl acrylate, butyl acrylate, 2-ethylhexyl acrylate, and other alkyl esters of acrylic acid with monohydric alcohols having 1 to 18 or more carbon atoms, and other methacrylic acid esters, for example, those of monohydric alcohols having 6 to 20 carbon atoms, such as hexyl methacrylate, decyl methacrylate, lauryl methacrylate, and the like.

The polymers above are used as a major film-forming component of coating compositions which usually include one or more pigments, which may be, for example, any of the various pigments commonly employed with methacrylate polymers. The compositions may also include various solvents, plasticizers, fillers, additives, and the like. These imine-modified polymers are employed, for example, in pigmented automotive lacquers, including pastel and polychromatic lacquers, in which colored and metallic pigments and various plasticizers and additives are conventionally included. Many of the above advantages of the interpolymers herein are with respect to such pigmented compositions, especially black formulations in which carbon black is a prime pigment.

The coating compositions employing the interpolymers herein are applied by conventional means, preferably by spraying, and are dried in the usual manner, generally by baking at temperatures of 180° F. to 300° F. for 10 to 30 minutes, although in some cases the compositions are air-dried at ambient temperatures. Such coating compositions can be applied to virtually any solid substrate with advantageous results. For example, these include glass, wood, hardboard, plastics, and various metals such as steel, treated steels, aluminum and others.

Set forth below are several examples of the invention illustrating the advantages obtained therefrom. These examples are not, of course, to be construed as limiting the invention to their details. All parts, ratios and percentages in the examples, as throughout this specification, are based on non-volatile solids content and are by weight, unless otherwise indicated.

Example 1

An interpolymer containing 2.5 percent of acid groups reacted with N-(2-hydroxyethyl)ethylenimine was prepared by slowly adding the following mixture to a vessel containing 1250 parts of refluxing toluene:

| | Parts by weight |
|---|---|
| Methyl methacrylate | 1218.75 |
| Methacrylic acid | 31.25 |
| Alpha, alpha'-azobis(isobutyronitrile) | 3.12 |
| Toluene | 156.0 |

After the addition, which took 110 minutes, was completed, 31.25 parts of N-(2-hydroxyethyl)ethylenimine were added. Refluxing was continued for about 4 hours, with a solution of 4.7 parts of azobis(isobutyronitrile) in 381 parts of toluene being slowly added over the first 3 hours. There were then added 537 parts of acetone and an additional 4.3 parts of N-(2-hydroxyethyl)ethylenimine, and the mixture was refluxed for 5 hours. The product had a solids content of 34.8 percent, a Gardner-Holdt viscosity of P+, and an acid value of 0.43.

The advantages of the above composition were illustrated by tests in which 10 parts of carbon black, 148 parts of the above polymer solution and 10 parts of toluene were ground in a steel ball mill for 72 hours. The dispersion was washed out of the mill with 32 parts of toluene. It was then examined and evaluated for fineness and uniformity of dispersion and freedom from agglomerated pigment particles, using standard criteria. For comparison, the same test and evaluation was carried out with a similar polymer which had been reacted with ethylenimine (in place of N-(2-hydroxyethyl)ethylenimine and also with a polymer without any acid-imine modification, i.e., consisting solely of methyl methacrylate. The comparative evaluation of the dispersions was as follows:

| Polymer: | Dispersion evaluation |
|---|---|
| Example 1 | Good |
| Ethylenimine-modified polymer | Poor |
| Unmodified polymer | Very poor |

Example 2

Following essentially the same procedure as in Example 1, a copolymer of 1240.6 parts of methyl methacrylate and 9.4 parts of methacrylic acid was produced, with the acid groups being reacted with 9.4 parts of N-(2-hydroxyethyl)ethylenimine. In tests carried out as above, this polymer had even better properties than that of Example 1, especially in dispersing pigments. For instance, using this polymer to disperse carbon black in the manner described in Example 1, a satisfactory dispersion was obtained in 24 hours. This disperson was also formulated into a black coating composition by blending the following:

| | Parts by weight |
|---|---|
| Pigment dispersion | 57.5 |
| Polymer solution (Example 2) | 111.0 |
| Cellulose acetate butyrate (38 percent butyrate, 2 second viscosity) | 20.0 |
| Butyl benzyl phthalate | 26.0 |
| Acetone | 107.5 |

This composition was coated on steel panels having thereon a cured layer of thermosetting sheet metal primer (based on phthalic alkyd resin vehicle containing 10 percent epoxy resin). The panels were then baked for 15 minutes at 220° F. and evaluated for standard properties, including jetness of the black finish (which is primarily a test of fineness and uniformity of the pigment dispersion). The results are shown below, along with comparative results of the evaluation (in the same manner) of a coating made from unmodified methyl methacrylate polymer.

| | Polymer | |
|---|---|---|
| | Example 2 | Unmodified |
| Jetness | Good | Poor. |
| Humidity resistance | do | Fair. |
| Reflow | do | Good. |
| Adhesion | Excellent | Poor. |

*Example 3*

The above procedure was again followed, except that 1246.88 parts of methyl methacrylate and 3.12 parts of methacrylic acid were used, giving a polymer containing 0.25 percent of acid groups which were reacted with 3.12 parts of N-(2-hydroxyethyl)ethylenimine. Again, good properties were obtained; for example, a dispersion of carbon black pigment (made as in the above examples) having satisfactory properties was obtained in 24 hours.

*Example 4*

An N-(2-hydroxyethyl)ethylenimine-modified polymer was made as in the above examples, except that the monomers employed comprised 990.6 parts of methyl methacrylate, 250 parts (20 percent) of butyl methacrylate and 9.4 parts (0.75 percent) of methacrylic acid. The imine reaction was carried out with 9.4 parts of N-(2-hydroxyethyl)ethylenimine. In tests as described above, this polymer gave greatly improved performance over an unmodified polymer (80 percent methyl methacrylate, 20 percent butyl methacrylate) as shown by the following:

| | Hydroxyalkyl Imine-Modified Polymer | Unmodified Polymer |
|---|---|---|
| Dispersion evaluation: | | |
| Grinding time | 24 hours | 72 hours. |
| Dispersion rating | Good | Very poor. |
| Coating evaluation: | | |
| Jetness | do | Poor. |
| Humidity resistance | do | Fair. |
| Reflow | do | Good. |
| Adhesion | Excellent | Poor. |

The invention is also applicable to interpolymers of lower alkyl methacrylates produced using other procedures. For example, one method of particular interest involves the interpolymerization of the monomers in the presence of a polymeric dispersing agent dissolved in a non-aqueous organic medium in which the interpolymer is substantially insoluble. U.S. Patents 3,095,388 and 3,166,524 describe certain polymerizations of this type and a number of the dispersing agents which can be utilized to obtain stable dispersions. These include natural and synthetic rubbers of various types, oils, hydrocarbon polymers and other materials which are essentially soluble in the organic medium and which contain sites, such as double bonds, to which some of the interpolymer molecules can attach. A specific example of the preparation of such an interpolymer in accordance with the invention is as follows:

*Example 5*

The following are charged into a reaction vessel:

| | Parts by weight |
|---|---|
| n-Heptane | 1500 |
| Methyl methacrylate | 990 |
| Methacrylic acid | 10 |
| Polyisoprene (viscosity 40,000–50,000 centipoises at 100° F.) | 25 |
| Tertiary-dodecyl mercaptan | 25 |
| Benzoyl peroxide | 10 |

This mixture is refluxed with agitation for five hours and cooled. The product is a stable dispersion having a solids content of 41.7 percent and a viscosity of 24 centipoises at 77° F. This dispersion (1500 parts) is mixed with 4.5 parts of N-(2-hydroxyethyl)ethylenimine and refluxed for 2 hours to produce the imine-modified interpolymer.

Similar results to those shown above are attained when other polymers and N-hydroxyalkyl alkylenimines as described herein are substituted for those employed in the foregoing examples. Surprisingly, however, closely related substituted alkylenimines other than N-hydroxyalkyl alkylenimines do not provide the improved properties mentioned. This was shown in one series of tests in which polymers were made using various N-substituted ethylenimines and evaluated by grinding carbon black therein, as described in Example 2. The results are shown below:

| Imine | Acid-Imine Level, Percent | Dispersion | |
|---|---|---|---|
| | | Time, Hours | Rating |
| N-(2-hydroxyethyl)ethylenimine | 0.75 | 24 | Good. |
| N-(2-aminoethyl)ethylenimine | 0.75 | 72 | Poor. |
| N-(2-cyanoethyl)ethylenimine | 0.75 | 72 | Do. |
| N-phenethyl ethylenimine | 0.75 | 72 | Do. |

As indicated, dramatically and unexpectedly improved results are achieved with the N-hydroxyalkyl-substituted imines exemplified by N-(2-hydroxyethyl)ethylenimine, even as compared to imines having closely related structures and other properties.

According to the provisions of the patent statutes, there are described above the invention and what are now considered to be its best embodiments. However, within the scope of the appended claims, it is to be understood that the invention can be practiced otherwise than as specifically described.

We claim:

1. An interpolymer of a mixture of monomers consisting essentially of:

(1) from about 50 percent to about 99.9 percent by weight of a lower alkyl methacrylate having 1 to 5 carbon atoms in the alkyl group;

(2) at least about 0.1 percent by weight of polymerizable ethylenically unsaturated carboxylic acid; and (3) from 0 percent to about 49.9 percent by weight of one or more other ethylenically unsaturated monomers copolymerizable with said methacrylate and said acid;

said interpolymer containing imine-modified acid units produced by the reaction of carboxylic acid groups with an N-hydroxyalkyl alkylenimine having 2 to 6 carbon atoms in the hydroxyalkyl group and 2 to 4 carbon atoms in the alkylenimine group, carboxylic acid that is reacted with said imine being from 0.1 percent to 3 percent by weight of said mixture of monomers.

2. The interpolymer of claim 1 in which said lower alkyl methacrylate is methyl methacrylate.

3. The interpolymer of claim 1 in which said lower alkyl methacrylate is a mixture of methyl methacrylate and butyl methacrylate.

4. The interpolymer of claim 1 in which said N-hydroxyalkyl alkylenimine is N-(2-hydroxyethyl) ethylenimine.

5. The interpolymer of claim 1 in which said other monomer is selected from the group consisting of alkyl acrylates having 1 to 18 carbon atoms in the alkyl group and alkyl methacrylates having 6 to 20 carbon atoms in the alkyl group and said acid contains 3 to 6 carbon atoms.

6. The interpolymer of claim 1 in which the weight of carboxylic acid that is reacted with said imine is from 0.1 percent to 1 percent of said mixture of monomers.

7. The interpolymer of claim 6 consisting essentially of methyl methacrylate and an acrylic acid.

8. The interpolymer of claim 1 in which said interpolymer is produced as a stable dispersion in a nonaqueous organic solvent in which said interpolymer is substantially insoluble.

9. A coating composition comprising finely and uniformly dispersed pigment, organic solvent, and the interpolymer of claim 1.

10. The coating composition of claim 8 in which said pigment comprises carbon black.

References Cited
UNITED STATES PATENTS

| | | | |
|---|---|---|---|
| 3,244,679 | 4/1966 | Schroder et al. | 260—86.1 |
| 3,261,796 | 7/1966 | Sims | 260—41 |
| 3,261,797 | 7/1966 | McDowell et al. | 260—41 |

MORRIS LIEBMAN, *Primary Examiner.*

L. T. JACOBS, *Assistant Examiner.*